(12) United States Patent
Van Den Berg

(10) Patent No.: US 12,350,777 B2
(45) Date of Patent: Jul. 8, 2025

(54) METHOD OF MACHINING AN ELONGATE WORKPIECE, MACHINING SYSTEM AND INTERMEDIATE PRODUCT ASSEMBLY

(71) Applicant: Voortman Steel Machinery Holding B.V., Rijssen (NL)

(72) Inventor: Jordy Van Den Berg, Rijssen (NL)

(73) Assignee: VOORTMAN STEEL MACHINERY HOLDING B.V., Rijssen (NL)

( * ) Notice: Subject to any disclaimer, the term of this patent is extended or adjusted under 35 U.S.C. 154(b) by 497 days.

(21) Appl. No.: 17/733,273

(22) Filed: Apr. 29, 2022

(65) Prior Publication Data
US 2022/0355431 A1 Nov. 10, 2022

(30) Foreign Application Priority Data
Apr. 30, 2021 (NL) ...................................... 2028116

(51) Int. Cl.
*B23Q 15/26* (2006.01)
*B23Q 17/22* (2006.01)
*B23Q 17/24* (2006.01)

(52) U.S. Cl.
CPC ............. *B23Q 15/26* (2013.01); *B23Q 17/22* (2013.01); *B23Q 17/2428* (2013.01)

(58) Field of Classification Search
CPC .... B23Q 15/26; B23Q 17/22; B23Q 17/2428; B23Q 15/22; B23Q 1/5406; G05B 2219/37002; G05B 2219/37593; G05B 2219/49112; G05B 2219/50052; B21D 3/10
See application file for complete search history.

(56) References Cited

U.S. PATENT DOCUMENTS

| | | | | |
|---|---|---|---|---|
| 3,656,734 A | * | 4/1972 | Davis | B23K 7/006 219/124.21 |
| 5,418,456 A | * | 5/1995 | Cook | G01B 7/312 324/227 |
| 6,568,096 B1 | * | 5/2003 | Svitkin | B23Q 17/20 82/162 |
| 2005/0061436 A1 | * | 3/2005 | Duns | B29C 63/048 156/244.11 |

(Continued)

FOREIGN PATENT DOCUMENTS

CN 218083531 U * 12/2022
DE 10 2013 018 654 A1 4/2015
(Continued)

OTHER PUBLICATIONS

Extended European Search Report for European Application No. 22170853.0 dated Oct. 7, 2022.
(Continued)

*Primary Examiner* — Alicia M. Choi
(74) *Attorney, Agent, or Firm* — Birch, Stewart, Kolasch & Birch, LLP

(57) ABSTRACT

A method of machining an elongate workpiece extending along a longitudinal axis and shaped to be supported rotationally instably about the longitudinal axis includes sensing a rotation of the workpiece about the longitudinal axis, thereby yielding a sensing result; and machining the workpiece at the machining station at least partly in dependence of the sensing result.

13 Claims, 2 Drawing Sheets

(56) References Cited

U.S. PATENT DOCUMENTS

| | | | |
|---|---|---|---|
| 2006/0207686 A1* | 9/2006 | Strebig | B27B 1/007 |
| | | | 144/394 |
| 2015/0338240 A1* | 11/2015 | Jiang | G01B 21/20 |
| | | | 324/207.25 |
| 2016/0259318 A1* | 9/2016 | Vogt | B23Q 17/2428 |

FOREIGN PATENT DOCUMENTS

| | | | | |
|---|---|---|---|---|
| GB | 2026730 A | * | 2/1980 | ............... B21D 3/10 |
| JP | 2001-353642 A | | 12/2001 | |
| JP | 2010-17731 A | | 1/2010 | |

OTHER PUBLICATIONS

Dutch Search Report, issued in Priority Application No. 2028116, dated Feb. 3, 2022.

* cited by examiner

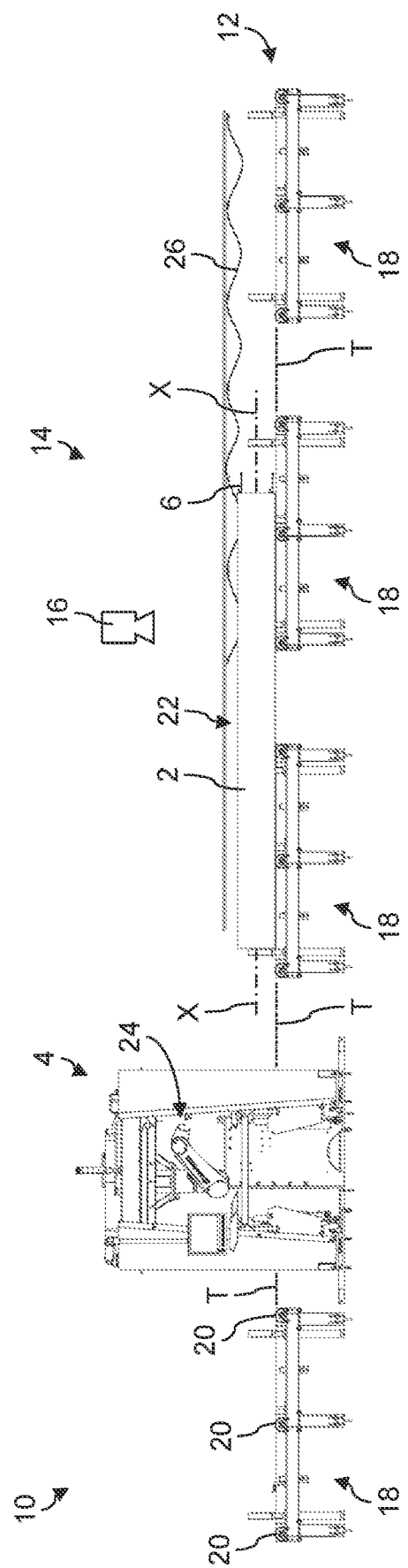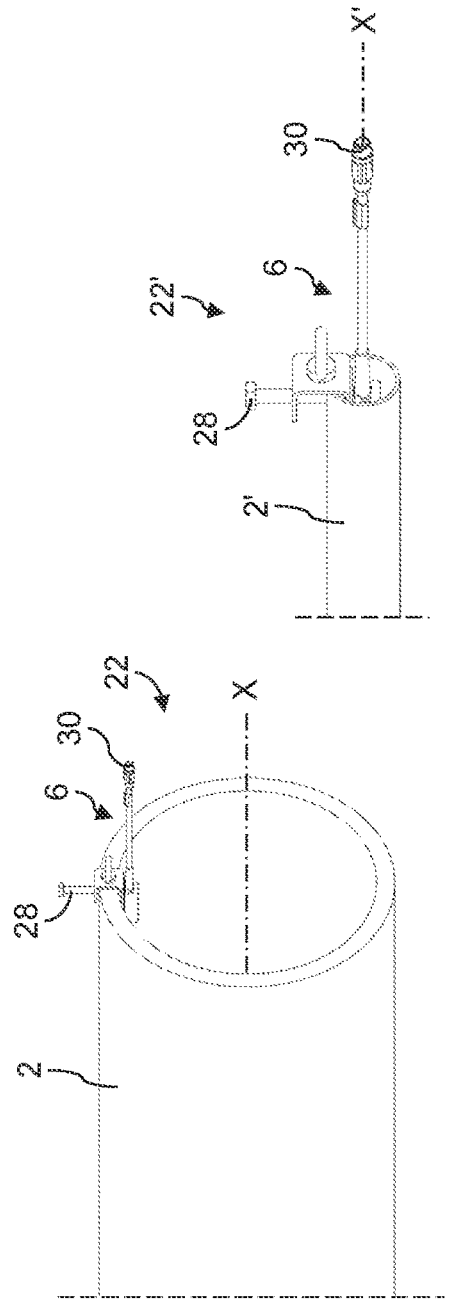

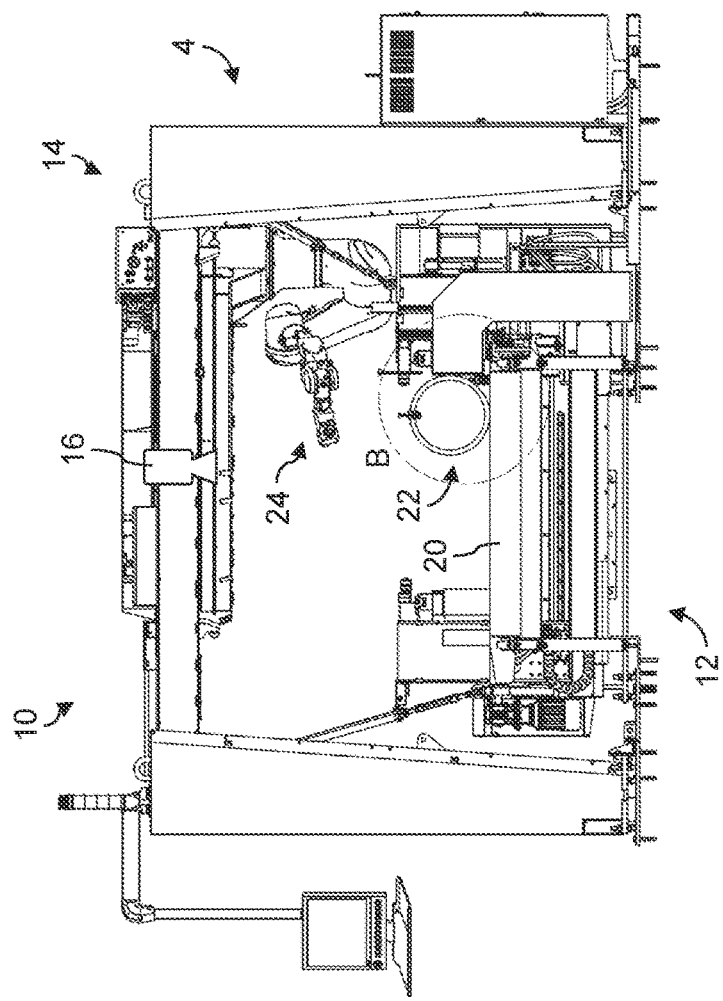
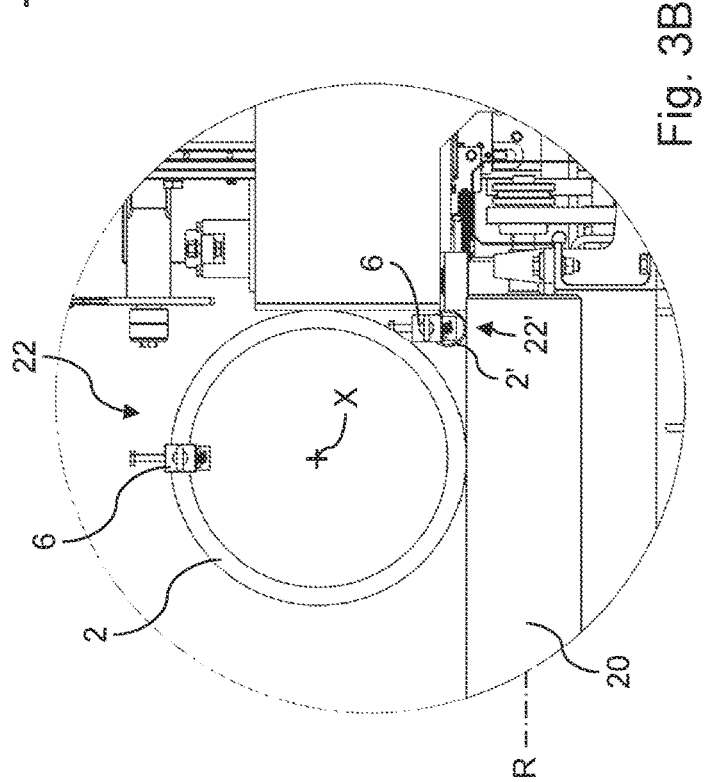
Fig. 3A
Fig. 3B

METHOD OF MACHINING AN ELONGATE WORKPIECE, MACHINING SYSTEM AND INTERMEDIATE PRODUCT ASSEMBLY

FIELD

The invention relates to a method of machining an elongate workpiece extending along a longitudinal axis and shaped to be supported rotationally instably about the longitudinal axis. The invention also relates to a machining system for machining such an elongate workpiece, and to an intermediate product assembly.

BACKGROUND

Methods and systems for machining elongate workpieces are known as such. In general, the workpieces are manufactured from a metal such as steel, copper, aluminium, and all types of alloys. However, a workpiece can also be manufactured from wood, plastic or combinations of wood, plastic and/or steel. Such workpieces extend along a longitudinal axis and can have a shape which causes the workpiece to be supported instably in a direction around the longitudinal axis, for example when the workpiece has a substantially cylindrical outer shape as can be the case for a cylindrical pipe. It will be readily understood that it requires clamping of a cylindrical pipe if one wishes to support the cylindrical pipe such that it is not able to rotate around its longitudinal axis. Hereafter, such workpieces which are prone to rotation when being supported without clamping will be designated as "rotationally instably shaped workpieces".

To enable a machining station to machine the workpiece at various positions along the longitudinal direction, the workpiece is often transported with respect to the machining station, generally along a transport path which extends parallel to the longitudinal direction. Traditionally, during the transporting, the rotation of such a rotationally instably shaped workpiece is actively inhibited, in particular fixed e.g. by clamping, to prevent that such rotations negatively affect the machining. Such active inhibition requires complex, costly and/or bulky equipment such as clamps.

Also, in some cases, it may be necessary or desired to temporarily suspend the active inhibition of the rotation to allow an operator to manipulate, in particular rotate, the workpiece manually (i.e. outside fully automatic control) prior to a subsequent machining step, for example to ensure that a desired part of the workpiece is subsequently accessible for machining by the machining station. Thus, in such a scenario, correct machining at least partly depends on a correct manipulation, e.g. rotation, by the operator. This implies a substantial risk of human error by the operator propagating to a faulty machining result by the machining station, and thus a risk of loss of precious time and materials in the overall machining process. This risk is particularly substantial when the workpiece is shaped to be supported rotationally instably, as such a shape can make it particularly difficult to rotate the workpiece sufficiently precisely.

Hence there is a need for improvement in the machining of such rotationally instably shaped elongate workpieces.

SUMMARY

An object of the invention is to provide an improved method of machining an elongate workpiece extending along a longitudinal axis and shaped to be supported rotationally instably about the longitudinal axis. An object is to provide such a method which requires less or no complex, costly and/or bulky equipment. An object is to provide such a method which is relatively simple, versatile and/or efficient. An object is to reduce a risk of human error in workpiece manipulation by an operator propagating to a faulty machining result.

To that end, an aspect of the invention provides a method of machining an elongate workpiece extending along a longitudinal axis and shaped to be supported rotationally instably about the longitudinal axis. The method comprises sensing a rotation of the workpiece about the longitudinal axis, thereby yielding a sensing result. The method comprises machining the workpiece at the machining station at least partly in dependence of the sensing result.

By sensing a rotation of the workpiece and machining the workpiece in dependence thereof, the workpiece can still be machined correctly without the need for complex equipment which would otherwise be needed to actively inhibit workpiece rotation. In particular, the machining can thus be adjusted to compensate for the rotation (if any). Also, any error in workpiece rotation by an operator may thus be detected in a timely manner to prevent propagation of the error to a faulty machining result. For example, the machining by the machining station may thus be paused while the error is not corrected. Alternatively or additionally, an indication for an operator may be generated to the effect of the operator (further) adjusting the rotation until correct subsequent correct machining at the machining station is thereby enabled.

A further aspect provides a machining system for machining an elongate workpiece extending along a longitudinal axis and shaped to be supported rotationally instably about the longitudinal axis. The machining system comprises a machining station configured to machine the workpiece. The machining system comprises a sensing system configured to sense a rotation of the workpiece about the longitudinal axis and to yield a sensing result based on the sensing. The machining station is configured to receive the sensing result yielded by the sensing system and to machine the workpiece at least partly in dependence of the received sensing result.

Such a machining system provides above-mentioned advantages, in particular by enabling execution of the described method.

A further aspect provides an intermediate product assembly comprising as an intermediate product an elongate workpiece extending along a longitudinal axis and shaped to be supported rotationally instably about the longitudinal axis. For machining the workpiece, for example during and/or after transport thereof, the workpiece is provided with a sensor which is rotatable along with the workpiece and which is configured to be responsive to a direction of gravity with respect to the sensor and/or to a rotation of the sensor or a part thereof.

Preferably, the sensor is configured to communicate, e.g. directly or indirectly, the sensor's response to a machining station of a machining system.

Such an intermediate product assembly can advantageously enable execution of the above-mentioned method, in particular in collaboration with a machining system which is configured to receive a sensing result from the sensor. The sensor of the intermediate product assembly can form part of the machining system as described herein.

It will be appreciated that the above-mentioned method can alternatively be carried out without such an intermediate product assembly, wherein for example the sensing comprises observing the workpiece using an observation device of the machining system while the workpiece is allowed to move with respect to the observation device, and determining the sensing result at least partly based on the observing.

In the context of the present invention, a yielded sensing result can be indicative of an absence of rotation about the longitudinal axis, i.e. a rotation having a size of zero. Accordingly, sensing a rotation of the elongate workpiece can comprise sensing an absence of such a rotation, i.e. sensing that subsequent rotational positions of the workpiece are substantially equal.

In the context of the present invention, an elongate workpiece extending along a longitudinal axis and shaped to be supported rotationally instably about the longitudinal axis can be understood as having an outer shape which is such that the workpiece is normally rotationally instable about the longitudinal axis when it is supported on a flat horizontal supporting surface. However, the shape of such a workpiece can be such that said rotational instability is achieved only in a limited range of rotational positions, e.g. as in the case of a workpiece with a semicircular outer shape, wherein rotational instability may be achieved only over a range of about 180 degrees. On the other hand, a workpiece, such as a fully rectangular beam, which, due to its outer shape, in practice always assumes a stable rotational position when supported on a flat horizontal surface, is herein understood as not being shaped to be supported rotationally instably about its longitudinal axis.

Depending on the overall machining to be performed on the workpiece, the sensing and machining can be repeated, optionally after (subsequent) transporting of the workpiece, wherein preferably each subsequent machining step is dependent on, in particular compensates for, one or more sensed rotations of the workpiece prior to and/or during the respective machining step.

DETAILED DESCRIPTION

In the following, the invention will be explained further using exemplary embodiments and drawings. The drawings are schematic and merely show examples. In the drawings, corresponding elements have been indicated with corresponding reference signs. In the drawings:

FIG. 1 shows a front view of an exemplary machining system;

FIG. 2A shows an isometric view of an end section of an exemplary intermediate product assembly;

FIG. 2B shows an isometric view of an end section of a further exemplary intermediate product assembly;

FIG. 3A shows a side view of the machining system of FIG. 1; and

FIG. 3B shows detail B of FIG. 3A.

FIGS. 1 and 3A-B show an exemplary machining system 10 for machining an elongate workpiece 2, 2' extending along a longitudinal axis X, X' and shaped to be supported rotationally instably about the longitudinal axis X, X'.

As best seen in FIG. 3B, two elongate workpieces 2 and 2', one 2 wider than the other 2', are shown in these drawings, as examples of a possible variety in sizes among machinable workpieces 2, 2'. It will be appreciated that in practice, it may be preferred to machine one workpiece at a time. Thus, in practice, the shown workpieces 2, 2' may be transported and machined mutually sequentially rather than in parallel.

The machining system 10 comprises a machining station 4 configured to machine the workpiece 2, 2'.

The machining station 4 may comprise a plasma cutter, for example mounted on a robotic arm 24, for machining the workpiece 2, 2' by plasma cutting. Alternatively or additionally, the machining station 4 may comprise a different type of machining instrument such as a drill, a mill or a saw. The machining station 4 is preferably computerized, meaning that it can operate at least partially automatically to execute one or more machining operations on the workpiece 2, 2', e.g. based on stored instructions and/or designs.

In an embodiment, the machining system 10 comprises a transport assembly 12 configured to transport the workpiece 2, 2' along a transport path T with respect to the machining station 4 while supporting the workpiece 2, 2' rotationally instably about the longitudinal axis X, X' such that the workpiece 2, 2' is allowed to rotate about the longitudinal axis X, X' at least partly randomly.

In an embodiment, the transport assembly 12 may be configured to transport the workpiece 2, 2' with its longitudinal axis X, X' substantially parallel to the transport path T.

In an embodiment, the transport assembly 12 may comprise a roller assembly 18 with rollers 20 for movably supporting the workpiece 2, 2' thereon. The rollers 20 have respective roller axes R which extend substantially transverse to the transport path T.

In FIG. 1, the roller axes R extend normal to the plane of the drawing. In FIGS. 3A-B, the transport path extends normal to the plane of the drawing.

Such transport assemblies 18 with rollers 20 are known as such and can support a wide variety of workpieces thereon while allowing the workpieces to be transported along the transport path T. In particular, some of the rollers 20 can advantageously drive the transporting along the transport path T while other rollers 20 can measure said transporting as part of a feedback controlled automated transport system. Alternatively or additionally, the transporting may be driven and/or measured by a pusher or gripper system or the like. For coordinated control of the transporting and the machining, the transport assembly 18 may be communicatively coupled to, e.g. integrated with, the computerized machining station 4.

As best seen in FIGS. 3A-B, the rollers 20 facilitate movement of the workpiece 2, 2' along the transport path T (which extends normal to the plane of the drawing in FIGS. 3A-B). Meanwhile, in this case, due to the rounded transversal outer shape of the workpiece 2, 2', the rollers 20 here support the workpiece 2, 2' rotationally instably about the longitudinal axis X, X'. Thus, depending on random perturbations, the workpiece 2, 2' may roll substantially randomly along a left-to-right direction in the view of FIGS. 3A-B. Such perturbations may occur naturally, e.g. as a result of small imperfections in the workpiece 2, 2' itself, in the rollers 20, in other parts of the machining system 10, and/or due to varying environmental factors. Also, machining of the workpiece 2, 2' by the machining station 4 may itself result in and/or contribute to a rotation of the workpiece 2, 2' about the longitudinal axis X, X', e.g. due to a change in weight distribution in the workpiece 2, 2' and forces exerted on the workpiece.

In an embodiment, the elongate workpiece 2, 2' has a substantially cylindrical outer shape with a cylinder axis which coincides with the longitudinal axis X, X'. Thus, the shown workpiece 2, 2' has a substantially circular transversal shape, as is most clearly seen in FIGS. 3A-B.

It will be appreciated that one or more non-circular transversal shapes can alternatively or additionally cause rotational instability of the workpiece about the respective longitudinal axis. Examples of such alternative or additional outer shapes include but are not limited to: semicircular shape, oval shape, ellipsoid shape, arc shape, curve shape, star shape, and rounded polygon shape. A transversal shape of the elongate workpiece may be substantially constant or variable along the longitudinal axis.

FIG. 1 shows the transport assembly 12 as comprising four roller assemblies 18, wherein the respective rollers 20 have been indicated for the left most roller assembly 18 only. It can be seen that the other roller assemblies 18 similarly comprise respective rollers. The roller assemblies 18 here together form a compound roller assembly which defines a single common transport path T extending along all shown roller assemblies 18 across their respective rollers 20.

It will be appreciated that the transport assembly 12 may be configured differently compared to the example shown.

The machining system 10 comprises a sensing system 14 configured to sense a rotation of the workpiece 2, 2' about the longitudinal axis X, X' and to yield a sensing result based on the sensing.

The machining station 4 is configured to receive the sensing result yielded by the sensing system 14 and to machine the workpiece 2, 2' at least partly in dependence of the received sensing result.

The sensing result is preferably received in a computer readable form, for example via a wired and/or wireless direct and/or indirect connection between the sensing system 14 and the machining station 4. As one option, FIG. 1 shows a movably suspended data cable 26 by which a sensor 6 of the sensing system 14 can be connected to the machining station 4, e.g. directly and/or via an intermediary communication or control system. A wireless connection may be realized as a radio connection or an optical connection, for example.

The exemplary machining system 10 can be used to carry out an exemplary method of machining such an elongate workpiece 2, 2'.

The exemplary method comprises: sensing a rotation of the workpiece 2, 2' about the longitudinal axis X, X', thereby yielding a sensing result; and machining the workpiece 2, 2' at the machining station 4 at least partly in dependence of the sensing result.

In an embodiment, the method further comprises transporting the workpiece 2, 2', in particular prior to and/or during the sensing, along the transport path T with respect to the machining station 4 while supporting the workpiece 2, 2' rotationally instably about the longitudinal axis X, X', thereby allowing the workpiece 2, 2' to rotate about the longitudinal axis X, X' at least partly randomly. Consequently, in this embodiment, the sensing of the rotation of the workpiece 2; 2' about the longitudinal axis X; X' thereby yielding a sensing result may, in particular, be done during and/or after the transporting of the workpiece 2; 2' along the transport path T.

In an embodiment, the workpiece 2, 2' is transported with its longitudinal axis X, X' substantially parallel to the transport path T.

In an embodiment, the machining system 10 is configured to adjust at least one predetermined machining parameter based on the sensing result, wherein the machining station 4 is configured to machine the workpiece 2, 2' in accordance with the at least one adjusted machining parameter.

In an embodiment, the method comprises, prior to and/or during the machining, adjusting at least one predetermined machining parameter based on the sensing result, wherein the workpiece 2, 2' is machined in accordance with the at least one adjusted machining parameter.

Such adjusting can advantageously compensate for a sensed rotation of the workpiece 2, 2', so that the workpiece 2, 2' is machined correctly substantially irrespective of a random, or at least partly uncontrolled, rotation of the workpiece 2, 2' about the longitudinal axis X, X'.

In an embodiment, the at least one predetermined machining parameter includes at least one of: a machining position, a machining direction, a machining orientation, a machining trajectory, a machining speed, a machining time, and a machining power.

For example, a machining position effected by a robot arm 24 and/or other actuator of the machining station 4 may be adjusted to compensate for a rotational position change of the workpiece 2, 2'.

In an embodiment, the sensing system 14 comprises a sensor 6 which is configured to be rotated about the longitudinal axis X, X' along with the workpiece 2, 2'.

In an embodiment, the sensing comprises obtaining a reading from a sensor 6 which is fixed to, at least rotatable along with, the elongate workpiece 2, 2'.

In an embodiment, the method further comprises fixing the sensor 6 to the elongate workpiece 2, 2', in particular prior to the transporting.

FIGS. 2A-B show a same exemplary sensor 6 fixed to differently sized workpieces 2 and 2', respectively. Here the sensor 6 is fixedly clamped to an exposed edge of the workpiece 2, 2' by clamping means which comprise a threaded bolt 28. Alternatively or additionally, other means may be employed to fix the sensor 6 to the workpiece 2, 2', for example using magnetic attachment, suction, adhesive, among other options. It is further noted that the sensor 6 may in principle be arranged at any convenient location on and/or in the workpiece 2, 2', for example at an inner surface or an outer surface, for example centrally or distally with respect to the longitudinal axis X, X', for example near a leading end or near a lagging end or centrally along the longitudinal axis X, X', etc.

The sensor 6 is here provided with a data cable connector 30 for connection to a data cable 26 through which the sensing result can be communicated to the machining station 4. Alternatively or additionally, the sensor may comprise a wireless communication unit, for example including an antenna for radio communication.

The sensor 6 may be powered via the data cable 26 and/or via an on-board battery (not shown), among other options.

In an embodiment, the sensor 6 is configured to be responsive to a direction of gravity with respect to the sensor 6 and/or to a rotation of the sensor 6 or a part thereof.

To that end, the sensor 6 may for example comprise an inclination sensor, e.g. in the form of an accelerometer or an encoder with a mass. A change in the direction of gravity with respect to the inclination sensor, which is fixed to the workpiece 2, 2', can imply a corresponding rotation of the workpiece 2, 2' about the longitudinal axis X, X', in particular when the longitudinal axis X, X' extends substantially horizontally.

Alternatively or additionally, the sensor 6 may comprise a gyroscope. A reading of a non-zero rotational speed by the gyroscope, which is fixed to the workpiece 2, 2', can imply a corresponding non-zero rotational movement of the workpiece 2, 2' about the longitudinal axis X. A total rotation (rotational position change) of the workpiece 2, 2' about the longitudinal axis X can be derived by integrating the rotational speed, as indicated by the gyroscope, over time.

To facilitate calculation of a current rotational position of the workpiece 2, 2' about the longitudinal axis X, X', an initial rotational position of the workpiece 2, 2' may be received by the sensing system 14 and/or the machining station 4, e.g. via a user interface and/or from a database.

In an embodiment, the method further comprises generating, based on the sensing result, an indication for an operator associated with the machining station. The indication may in particular comprise an instruction or suggestion to adjust a rotation of the workpiece. Such an indication may be communicated to the operator via a user interface of the machining station, for example. As the operator adjusts the workpiece in response to the received indication, the method may comprise continuing to sense the rotation of the workpiece, and, if needed, generating a further indication for the operator. If and when it is determined that a rotational position of the workpiece is suitable for starting or continuing the machining by the machining station, this may be indicated to the operator. Alternatively or additionally the machining station may upon such determination automatically proceed with the machining, optionally after indicating this to an operator. Thus, a machining time (e.g. of starting and/or continuing the machining) may be adjusted based on the sensing result. An improved human-machine collaboration for machining elongate workpieces can thus be realized, in particular with reduced risk of human error by the operator propagating to a faulty machining result.

The figures, in particular FIGS. 2A-B, show examples of an intermediate product assembly 22, 22' comprising as an intermediate product the elongate workpiece 2, 2' extending along the longitudinal axis X, X' and shaped to be supported rotationally instably about the longitudinal axis X, X'. For machining the workpiece 2, 2', for example during and/or after transport thereof, the workpiece 2, 2' is provided with the sensor 6 which is rotatable along with the workpiece 2, 2' and which is configured to be responsive to a direction of gravity with respect to the sensor 6 and/or to a rotation of the sensor 6 or a part thereof, as described.

In an embodiment, the sensing system 14 may comprise an observation device 16 which is configured to observe the workpiece 2, 2' while the workpiece 2, 2' is allowed to move with respect to the observation device 16, wherein the observation device 16 is configured to determine the sensing result at least partly based on the observing.

In an embodiment, the sensing comprises observing the workpiece 2, 2' using an observation device 8 while the workpiece 2, 2' is allowed to move with respect to the observation device 8, and determining the sensing result at least partly based on the observing.

The observation device 16 may comprise one or more cameras, for example a 2D or 3D camera. Alternatively or additionally, the observation device 16 may comprise a contactless speed sensing device, for example based on the Doppler effect, for example using laser and/or radar. The observation device 16 may comprise means for illuminating or otherwise actively observing the workpiece 2, 2', for example by a laser or other light source or other radiation source.

While FIG. 1 shows the observation device 16 as a singular device arranged at a substantially singular position along the transport path T, the observation device 16 may comprise multiple devices, e.g. cameras, distributed along the transport path T and/or one or more observation devices which are movable along the transport path T, in particular to follow and/or scan the workpiece 2, 2', for example during transporting thereof.

To facilitate observation by the observation device 16, the workpiece 2, 2' may be provided with one or more markings on an outer surface thereof, for example in the form of a coloring, a relief and/or an appendix such as a clamped-on marker assembly. In the shown example, the clamped sensor 6 could serve as such a marker assembly, however a marker assembly can be provided without such integrated sensing capabilities.

In an embodiment, the sensing system 14 comprises a combination of the sensor 6 and the observation device 16, wherein for example along one section of the transport path T the workpiece 2, 2' is observed by the observation device 16 while along a further (e.g. partly overlapping) section of the transport path T rotation of the workpiece 2, 2' is (alternatively or additionally) sensed via the sensor 6. Such a combination can provide additional design freedom, e.g. to adapt to environmental conditions which may vary along the transport path.

In an embodiment, for further machining the workpiece 2, 2', the sensing and machining are repeated, and optionally transporting is also repeated (e.g. continued or reversed). For example, after a first machining step, the workpiece 2, 2' is transported further along the transport path T, e.g. in the same or a reverse direction, wherein a further rotation of the workpiece 2, 2' is sensed during and/or after the further transporting, wherein a subsequent machining step is performed during and/or after the further transporting in dependence of a received sensing result from the sensing of the further rotation. The transporting, sensing and rotation-compensated machining can thus be repeated over and over until the workpiece 2, 2' has been machined as desired, e.g. depending on a predetermined design.

While the invention has been explained using exemplary embodiments and drawings, these are not to be interpreted as limiting the scope of the invention as defined by the claims. Many variations, combinations and extensions are possible, as will be appreciated by the skilled person. Examples thereof have been provided throughout the description.

The invention claimed is:

1. A method of machining an elongate workpiece extending along a longitudinal axis and shaped to be supported rotationally instably about the longitudinal axis, the elongate workpiece being a metal cylindrical pipe and the longitudinal axis being a cylinder axis of the elongate workpiece, the method comprising:
   transporting the workpiece along a transport path with respect to a machining station while supporting the workpiece rotationally instably about the longitudinal axis, thereby allowing the workpiece to rotate about the longitudinal axis at least partly randomly;
   during or after the transporting, sensing a rotation of the workpiece about the longitudinal axis, thereby yielding a sensing result; and
   machining the workpiece at the machining station at least partly in dependence of the sensing result,
   wherein the sensing comprises obtaining a reading from a sensor fixed to and rotatable along with the elongate workpiece.

2. The method according to claim 1, comprising, prior to and/or during the machining, adjusting at least one predetermined machining parameter based on the sensing result, wherein the workpiece is machined in accordance with the at least one adjusted machining parameter.

3. The method according to claim 2, wherein the at least one predetermined machining parameter includes at least one of: a machining position, a machining direction, a machining orientation, a machining trajectory, a machining speed, a machining time, and a machining power.

4. The method according to claim 1, further comprising, prior to the transporting, fixing the sensor to the elongate workpiece.

5. The method according to claim 1, wherein the workpiece is transported with the longitudinal axis thereof substantially parallel to the transport path.

6. The method according to claim 1, wherein for further machining the workpiece, the sensing and machining are repeated.

7. The method according to claim 1, further comprising generating, based on the sensing result, an indication for an operator associated with the machining station.

8. A machining system for machining an elongate workpiece extending along a longitudinal axis and shaped to be supported rotationally instably about the longitudinal axis, the elongate workpiece being a metal cylindrical pipe and the longitudinal axis being a cylinder axis of the elongate workpiece, the machining system comprising:
- a machining station configured to machine the workpiece;
- a transport assembly configured to transport the workpiece along a transport path with respect to the machining station while supporting the workpiece rotationally instably about the longitudinal axis such that the workpiece is allowed to rotate about the longitudinal axis at least partly randomly; and
- a sensing system configured to sense a rotation of the workpiece about the longitudinal axis during or after transporting to yield a sensing result based on the sensing,
wherein the sensing system comprises a sensor configured to be fixed to the workpiece and to be rotated about the longitudinal axis along with the workpiece, and
wherein the machining station is configured to receive the sensing result yielded by the sensing system and to machine the workpiece at least partly in dependence of the received sensing result.

9. The machining system according to claim 8, wherein the machining system is configured to adjust at least one predetermined machining parameter based on the sensing result, wherein the machining station is configured to machine the workpiece in accordance with the at least one adjusted machining parameter.

10. The machining system according to claim 8, wherein the sensor is configured to be responsive to a direction of gravity with respect to the sensor and/or to a rotation of the sensor or a part thereof.

11. The machining system according to claim 8, wherein the transport assembly is configured to transport the workpiece with the longitudinal axis thereof substantially parallel to the transport path.

12. The machining system according to claim 8, wherein the transport assembly comprises a roller assembly with rollers for movably supporting the workpiece thereon, wherein the rollers have respective roller axes extending substantially transverse to the transport path.

13. An intermediate product assembly comprising as an intermediate product an elongate workpiece extending along a longitudinal axis and shaped to be supported rotationally instably about the longitudinal axis, wherein, for machining the workpiece, the workpiece is provided with a sensor fixed to and rotatable along with the workpiece and configured to be responsive to a direction of gravity with respect to the sensor and/or to a rotation of the sensor or a part thereof.

* * * * *